United States Patent [19]
Poindexter

[11] Patent Number: 5,651,657
[45] Date of Patent: Jul. 29, 1997

[54] CARGO HANDLING DEVICE WITH A VERTICAL LIFT

[76] Inventor: David A. Poindexter, 708 Patterson St., Stoughton, Wis. 53589

[21] Appl. No.: 655,962

[22] Filed: May 31, 1996

[51] Int. Cl.⁶ ............................................................. B60P 1/00
[52] U.S. Cl. .......................... 414/541; 414/549; 414/728; 414/462; 254/3 R; 187/222
[58] Field of Search ..................... 414/539, 340, 414/541, 542, 543, 545, 462, 546, 549, 556, 557, 742, 560, 522, 754, 728; 254/2 R, 3 R, 3 B, 3 C, 2 B, 2 C; 187/222, 233, 234, 238

[56] References Cited

U.S. PATENT DOCUMENTS

| | | | |
|---|---|---|---|
| 3,064,834 | 11/1962 | Dempster et al. | 414/539 X |
| 3,381,835 | 5/1968 | Lee . | |
| 3,620,391 | 11/1971 | Fujioka . | |
| 3,807,592 | 4/1974 | Lynn et al. . | |
| 4,023,690 | 5/1977 | Goode | 214/146.5 |
| 4,039,096 | 8/1977 | McAllister | 414/462 |
| 4,081,095 | 3/1978 | Wilburn et al. . | |
| 4,251,178 | 2/1981 | Bourgraf et al. | 414/343 |
| 4,260,314 | 4/1981 | Golze | 414/462 |
| 4,278,387 | 7/1981 | Seguela et al. | 414/462 |
| 4,297,071 | 10/1981 | Dunbar | 414/542 |
| 4,354,791 | 10/1982 | Antonellis | 414/343 |
| 4,573,854 | 3/1986 | McFarland | 414/462 |
| 4,621,972 | 11/1986 | Grotte | 414/477 |
| 4,647,110 | 3/1987 | McKee | 298/1 |
| 4,728,244 | 3/1988 | Stokkendal | 414/462 |
| 4,778,327 | 10/1988 | Tufenkian et al. | 414/549 X |
| 4,950,123 | 8/1990 | Brockhaus | 414/522 |
| 5,096,361 | 3/1992 | Crawford | 414/462 |

FOREIGN PATENT DOCUMENTS

| | | | |
|---|---|---|---|
| 851025 | 9/1970 | Canada | 414/462 |
| 2619768 | 3/1989 | France . | |
| 3633862 | 9/1988 | Germany | 414/541 |
| 219434 | 9/1988 | Japan | 414/540 |
| 2105296 | 7/1982 | United Kingdom . | |

*Primary Examiner*—Frank E. Werner
*Attorney, Agent, or Firm*—Godfrey & Kahn, S.C.

[57] ABSTRACT

A cargo handling device for use in an overland vehicle. The cargo handling device includes a base frame which is capable of being mounted on the floor of the overland vehicle. A pair of extension members is individually borne by the base members and moveable along a predetermined path of travel from a first, stowed position, to a second, deployed position. A vertical lift is connected to each of the individual extension members at a single pivot point on each respective extension member. The lift can move from a first position, where the it is disposed in a substantially horizontal position, to a second position, where the it is disposed in a substantially vertical position. The vertical lift includes one or more longitudinally positioned tracks and an actuator having a first portion which is mounted to the lift and a second portion. A cargo support assembly is slidably engaged with the one or more tracks and connected to the second portion of the actuator. The actuator is operable to move the cargo support assembly in a substantially vertical direction between a first, low position and a second, high position.

13 Claims, 9 Drawing Sheets

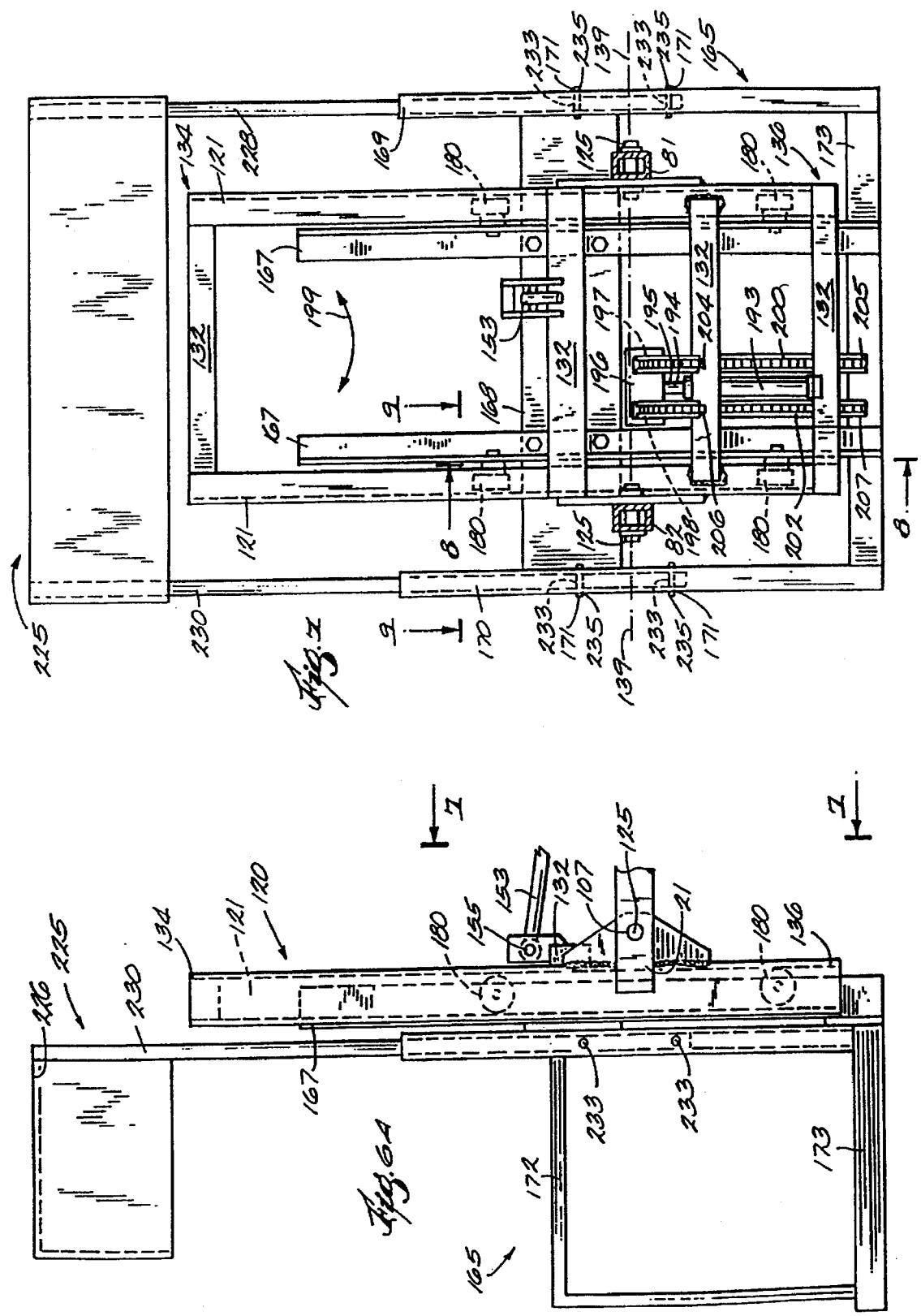

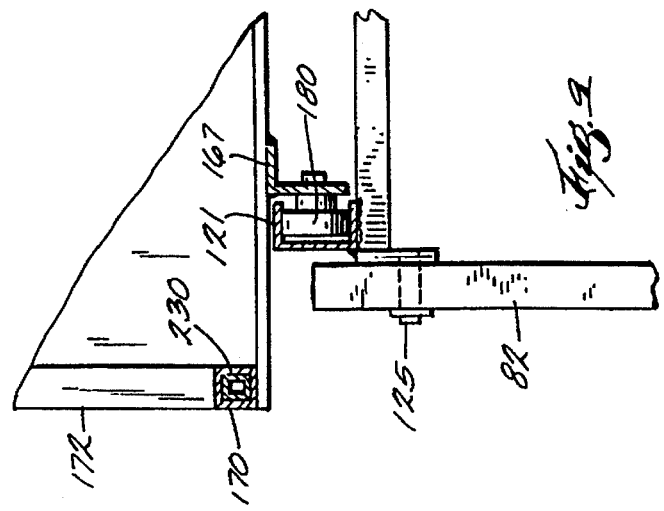
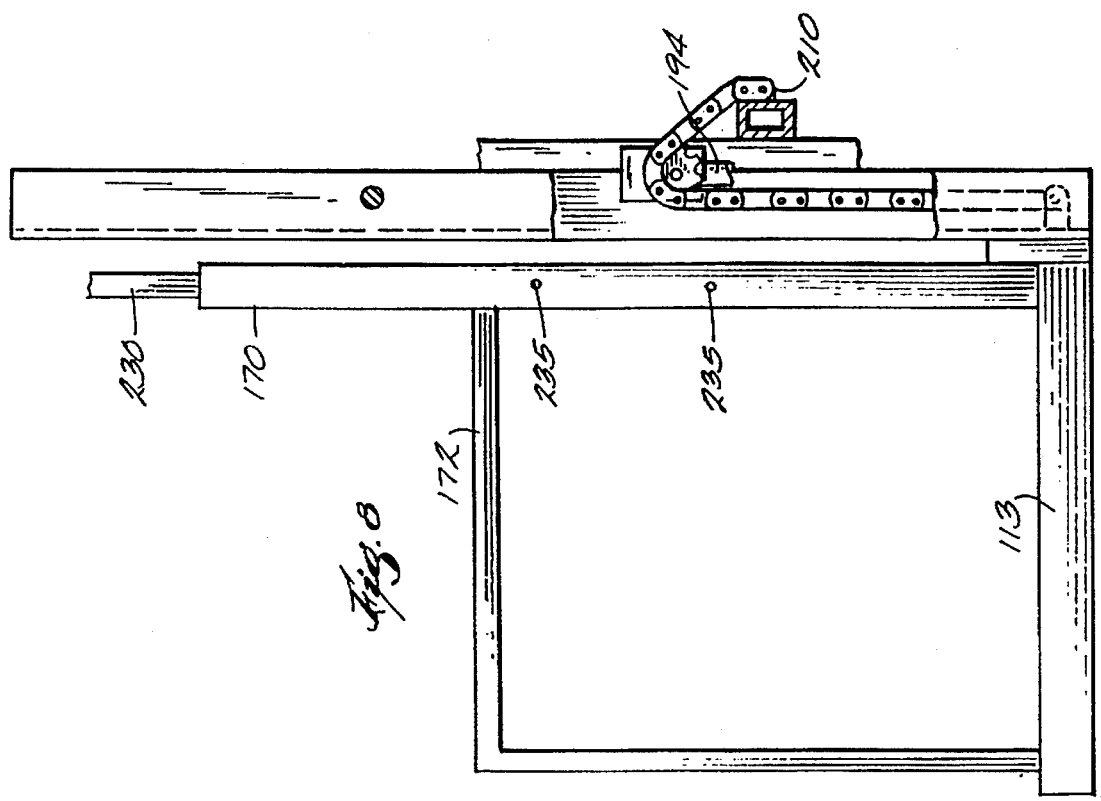

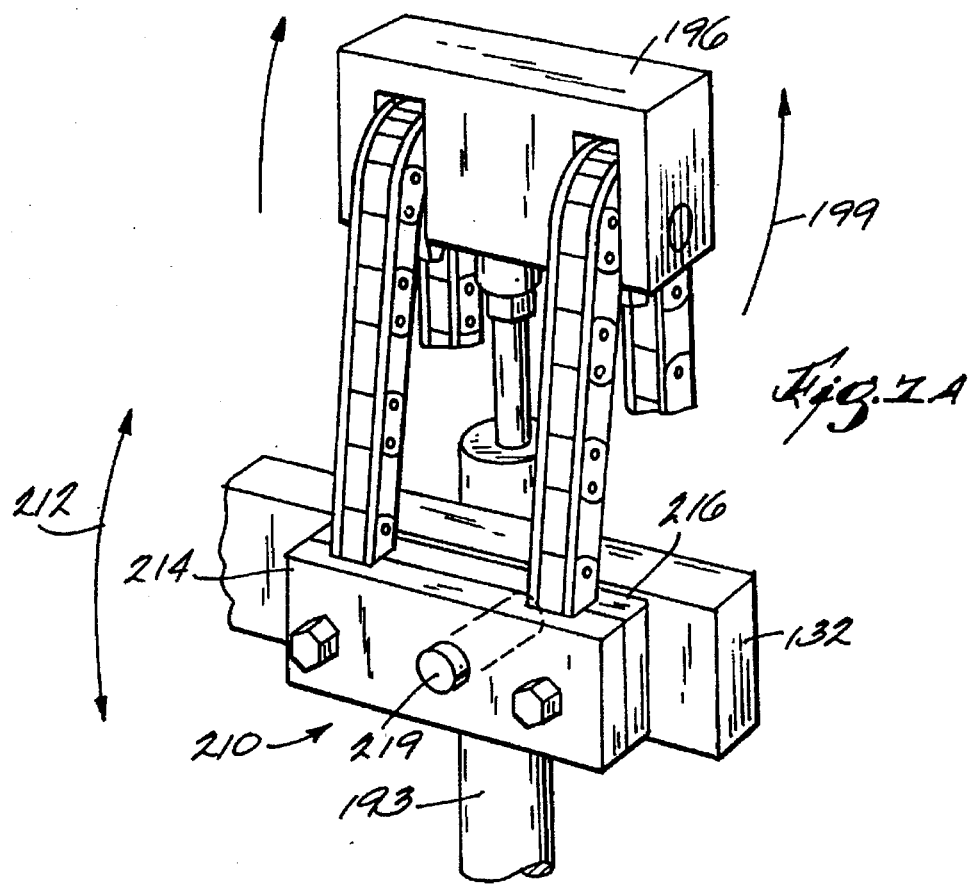
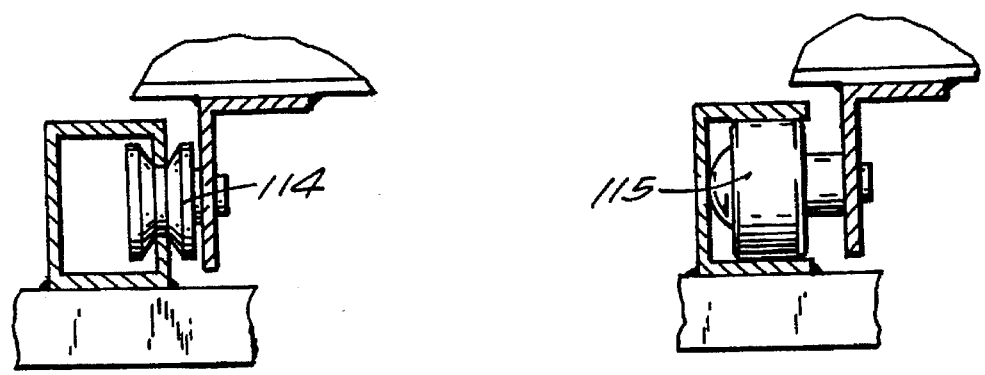

CARGO HANDLING DEVICE WITH A VERTICAL LIFT

BACKGROUND OF THE INVENTION

The present invention relates to cargo handling devices for use in overland vehicles such as passenger vans, minivans, and other similarly designed vehicles. More particularly, the present invention relates to a cargo handling device that has a vertical lift and that is operable to load and unload relatively tall cargo and raise and lower that cargo.

There are numerous cargo handling devices used to load or unload cargo from various overland vehicles such as automobiles, vans, and the like. Mounting these prior-art cargo handling devices normally requires significant modification of the vehicle. Typically, the overland vehicles are less useful when modified and, sometimes, aesthetically unappealing. Often, the prior-art cargo handling assemblies have been considered rather cumbersome, and frequently unduly complex.

Many prior-art devices fail to orient the cargo in an appropriate position for ease of handling. Often devices used in connection with automobiles and vans fail to position the cargo at an appropriate height for loading and unloading. This problem is particularly acute when loading and unloading must be carried out at loading docks. Typically, loading docks are designed for use with large trucks having cargo areas which are three, four, or even more feet above ground level. As most other vehicles have cargo areas which are significantly lower, cargo must be lowered from or lifted to the dock in addition to it being loaded or unloaded from the vehicle. Thus in many situations, loading and unloading cargo to and from the cargo area of the vehicle is only one half of the handling task.

In addition, known cargo handling devices have not been designed to optimize the available cargo space in overland vehicles. Thus, transporting relatively tall items in vehicles having cargo areas of limited height has been impossible. As can be appreciated, if a device permitted tall cargo to be loaded into relatively inexpensive vehicles such as station wagons, cargo carriers could avoid using bigger, more expensive vehicle to transport such cargo.

Accordingly, it would be desirable to have a device which facilitated the loading and unloading of cargo from a vehicle having a relatively low cargo area at relatively high loading docks. In addition, it would be even more desirable if this same device permitted the loading and unloading of relatively tall cargo in a vehicle having a cargo area of limited height.

SUMMARY OF THE INVENTION

Therefore, it is an object of the present invention to provide an improved cargo handling device for overland vehicles and the like.

Another object of the present invention is to provide a cargo handling device that is designed to load and unload relatively tall cargo into and out of a vehicle having a cargo area of limited height.

Another object of the present invention is to provide a cargo handling device that is designed to raise and lower cargo from a cargo area which is relatively low to the ground so that the cargo may be loaded and unloaded at loading docks which are relatively high to the ground.

These and other objects and advantages are achieved in a cargo handling device that is designed for use in an overland vehicle and that includes a base frame having a pair of support members which are capable of being releasably mounted on the overland vehicle and a pair of extension members which are individually slidably borne by the respective support members. The extension members each have proximal and opposite distal ends are moveable along a predetermined path of travel between a first, stowed or retracted position, and a second, deployed or extended position.

A vertical lift is coupled to each of the individual extension members at a single pivot point on each respective extension member. The vertical lift is rotatably moveable on a single axis which is substantially perpendicular to the distal end portions of each of the individual extension members. The lift can move from a first position, where it is disposed in a substantially horizontal position, to a second position, where it is disposed in a substantially vertical position. The vertical lift includes one or more longitudinally positioned tracks and an actuator having a first portion which is mounted to the lift and a second portion.

A cargo support assembly is slidably engaged with the one or more tracks and connected to the second portion of the actuator. The actuator is operable to move the cargo support assembly in a substantially vertical direction between a first, low position and a second, high position.

BRIEF DESCRIPTION OF THE DRAWINGS

FIG. 6A is a side elevation view of the vertical lift and cargo support assembly of the present invention.

FIG. 7 is a cross-sectional view of the vertical lift and cargo support assembly taken along the line 7—7 of FIG. 6A.

FIG. 7A is an enlarged, partial view of the vertical lift showing the powered cylinder and chain and pulley system.

FIG. 8 is a cross-sectional view of the vertical lift and cargo support assembly taken along the line 8—8 of FIG. 7.

FIG. 9 cross-sectional view taken from a position along line 9—9 of FIG. 7.

FIG. 9A is a cross-sectional view of a bearing assembly and track suitable for use in the present invention.

FIG. 9B is a cross-sectional view of a second bearing assembly and track suitable for use in the present invention.

DETAILED DESCRIPTION OF THE INVENTION

Figure 1:
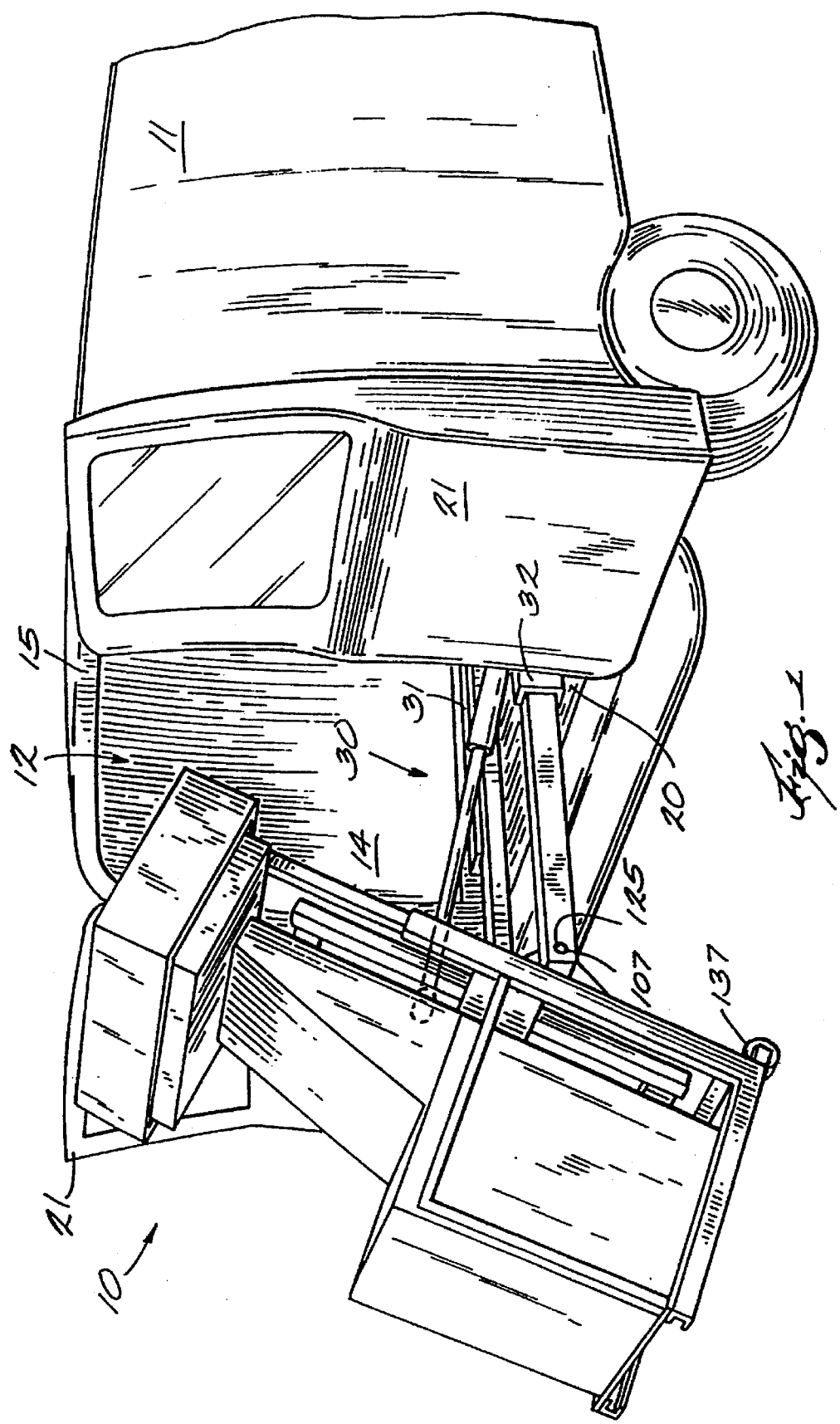
FIG. 1 is a perspective, environmental view of the cargo handling device of the present invention shown installed on an overland vehicle which is depicted as a van of conventional design.
Figure 2:
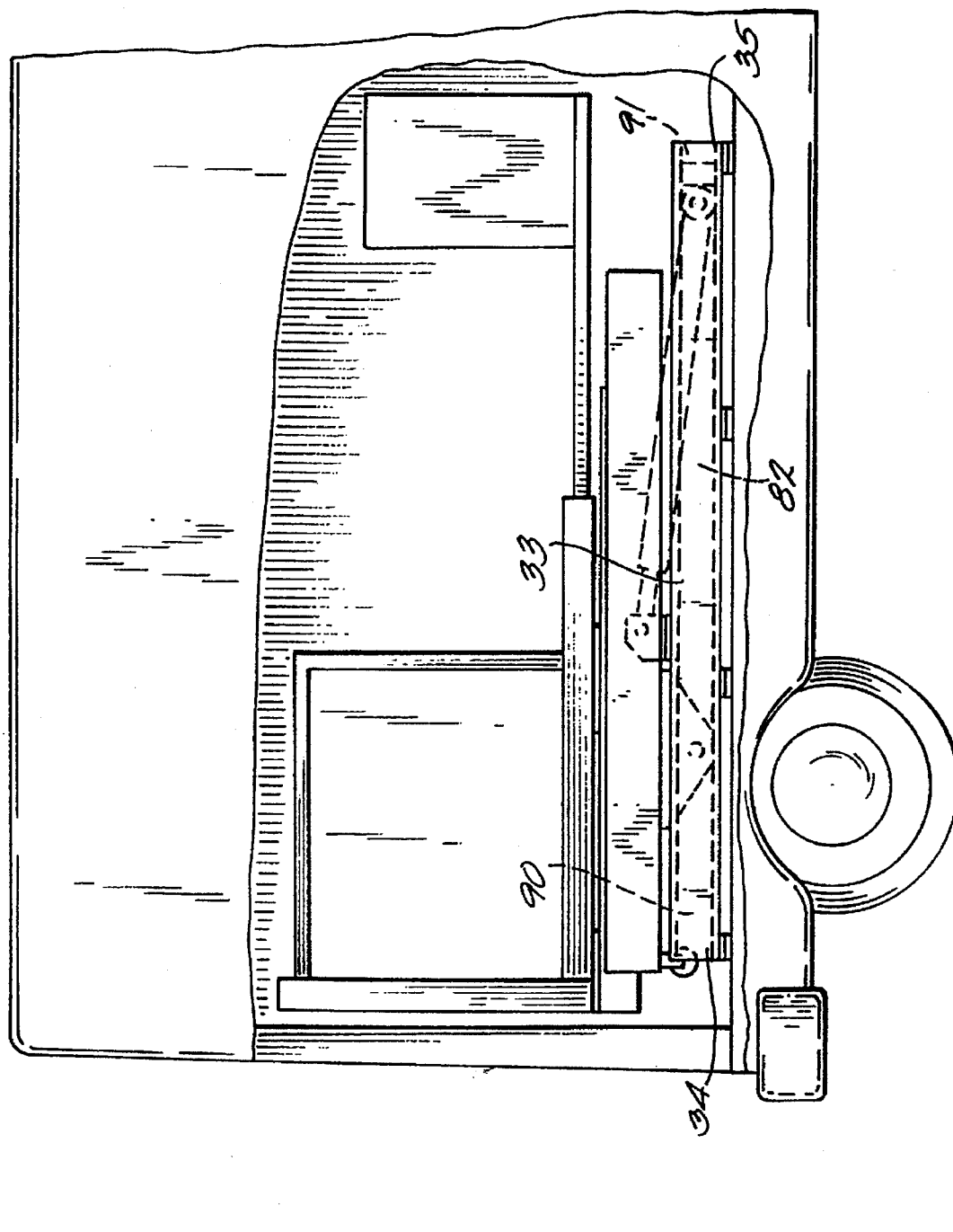
FIG. 2 is a partial, environmental, side elevation view of the cargo handling device of the present invention holding cargo as it would appear when located in the cargo area of the overland vehicle.
Figure 3:
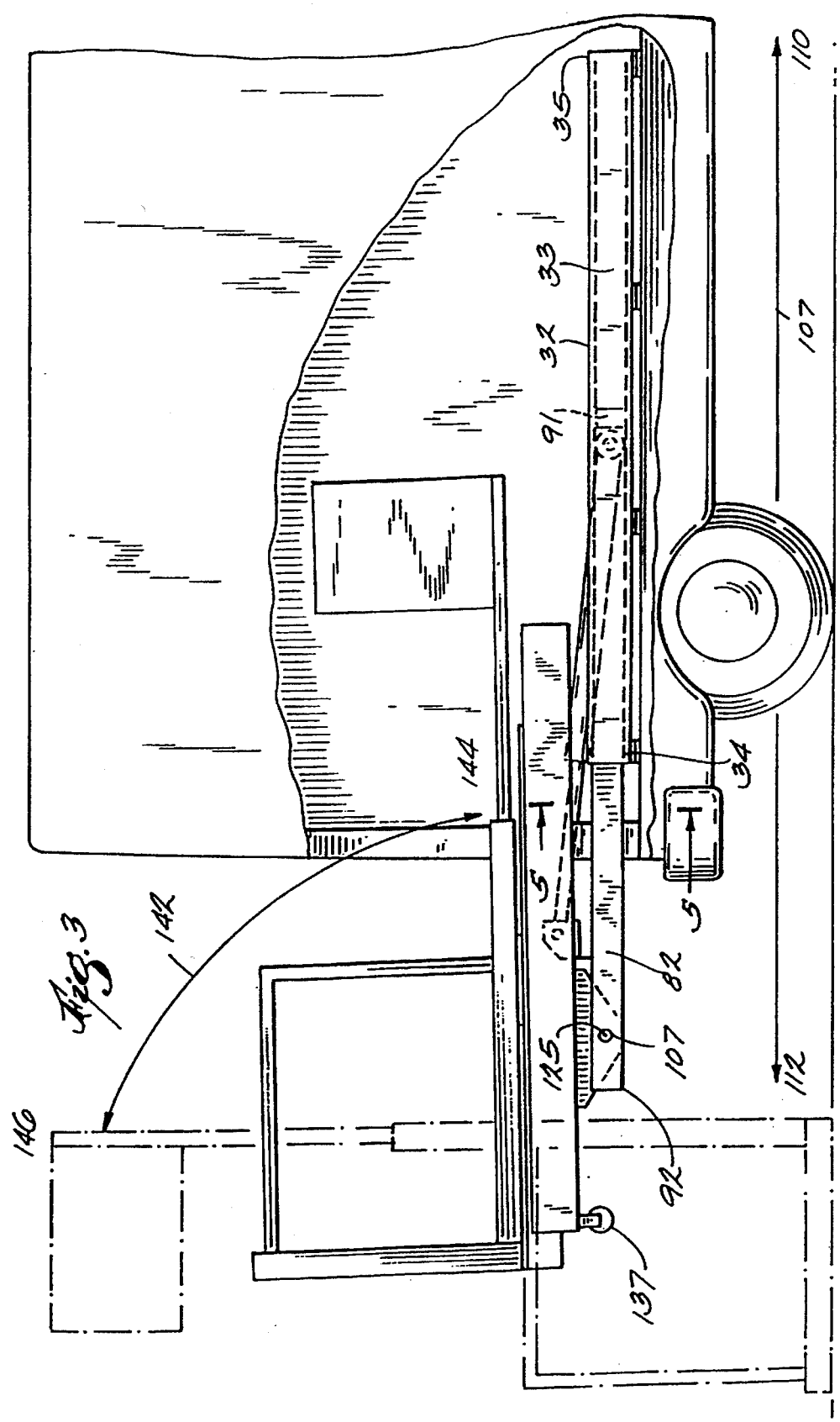
FIG. 3 is a partial, environmental, side elevation view of the cargo handling assembly of the present invention and illustrates, in phantom lines, the movement of the cargo from the overland vehicle to an orientation where it can be removed from the cargo handling assembly.

A cargo handling device 10 constructed in accordance with the teachings of the present invention is shown in FIG. 1. The cargo handling device may be used in a variety of overland vehicles, but is particularly useful in vehicles having a cargo area of limited height, such as station wagons, minivans, or standard-sized vans. An exemplary van 11 is shown in the drawings.

The van 11 has a cargo area 12 defined by sidewalls 14, a roof 15, and a floor 20. A pair of rear doors 21 allow access to the cargo area 12. The van 11, as is typical for such vehicles, has floor mounts (not shown) installed on the floor 20 which are used to secure removable seats. The floor mounts are positioned a given distance apart and are operable to releasably fix the cargo handling device 10 in the cargo area 12. The cargo handling device 10 is secured to the individual mounts by employing fasteners and other similar assemblies known in the art.

As best seen by reference to FIGS. 1–5, the cargo handling device 10 includes a base frame 30 that is, as noted above, releasably fixed on the floor 20. The base frame includes first and second base or support members 31 and 32, respectively, which are disposed in substantially parallel spaced relation one to the other. The individual support members each have a C-shaped main body 33 which includes a first or proximal end 34 and a second or distal end 35. The main body 33 also has an exterior facing surface 43 and an opposite, interior facing surface 44 which defines a channel 45. The individual support members 31 and 32 are fixed on the floor 20 by brackets 50.

The cargo handling device 10 has a pair of extension members 81 and 82. The members 81 and 82 are nested within and slidably coact with each of the first and second support members 31 and 32, respectively. Each extension member is constructed from rectangularly-shaped tubing and has a first, or proximal end 90, and a second, or distal end 91. One or more bearing assemblies 93, shown as wheels, are mounted on each extension member. As best seen by reference to FIG. 5, the bearing assemblies 93 are designed to engage the C-shaped support members 31 and 32. Thus, the extension members 81 and 82 are telescopingly movable with respect to the support members 31 and 32, respectively, along a linear path of travel 107 (FIG. 3) between a first, retracted position 110, where the distal end 91 of the respective extension members is positioned closely adjacent to the distal end 35 of the individual support members 31 and 32, and a second, extended position 112, where the distal ends 91 of the respective extension members 81 and 82 and the distal ends 35 of the support members 31 and 32 are spaced a predetermined distance apart.

The bearing assemblies 93, though shown as wheels, may take a variety of forms. For some applications it is preferred that the bearing assemblies 93 be side-guide or ball-transfer bearings. Other bearings suitable for use include V-cam follower bearings. An exemplary V-cam follower bearing 114 is shown in FIG. 9A. An exemplary side-guide bearing 115 is shown in FIG. 9B.

As best seen by reference to FIGS. 1, 6A, and 7, in one embodiment of the present invention each extension member has an aperture 107. A vertical lift 120 which includes two C-shaped members or tracks 121 is pivotally connected to the extension members. In particular, the tracks 121 are connected to the extension members 81 and 82 by pivots 125 which are received through apertures 127 in two flanges 129 and the apertures 107 in each extension member 81 and 82.

The tracks 121 could be pivotally mounted to a pair of carriages (not shown) which in turn could be individually mounted to the extension members 81 and 82. Such a structure is disclosed in a pending U.S. application, Ser. No. 08/594,829, the disclosure of which is hereby incorporated by reference.

The tracks 121 are connected to each other by two cross-pieces 132. The vertical lift also has top and bottom ends 134 and 136. Connected to the bottom end of the vertical lift 120 are one or more wheels 137 for engaging the ground or whatever other surface the overland vehicle rest upon. The wheels 137 assist the rotation or pivoting of the vertical lift 120.

The vertical lift 120 is mounted to the distal end portion of each of the extension members at a single pivot point, e.g., each pivot 125. The vertical lift 120 is rotatably moveable on a single axis 139 (FIG. 7) in space, which is substantially perpendicular to the distal end portions of each of the individual extension members. Thus, the top end 134 of the vertical lift 120 is rotatable about a single axis and along a arcuate path of travel 142 (FIG. 3) between a first position 144, where the tracks 121 are disposed in a substantially horizontal orientation, and a second, vertical position 146, where the tracks are in a substantially vertical orientation.

Figure 4:
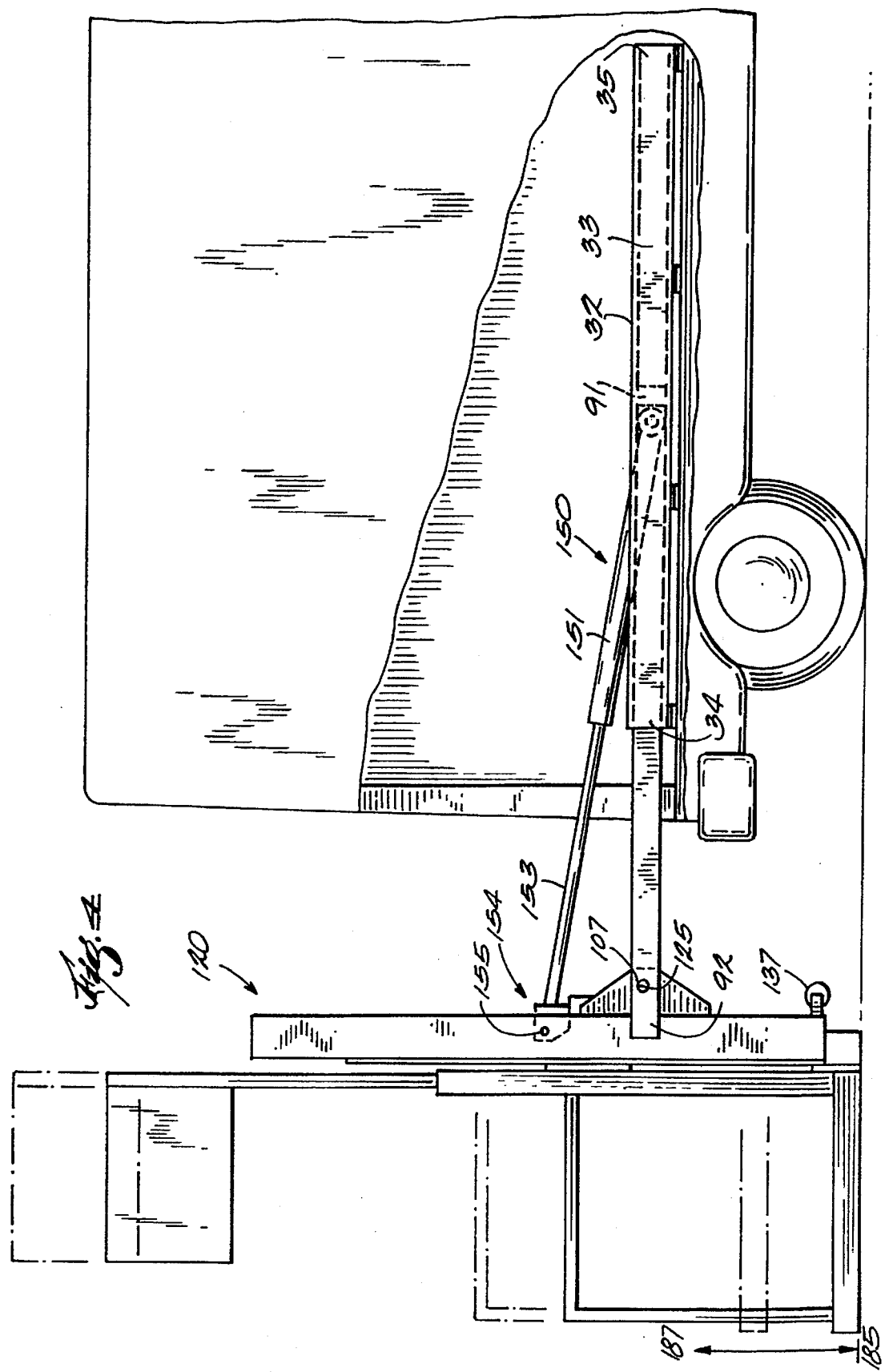
FIG. 4 is a partial, side elevation view of the cargo handling device oriented in a position to receive or discharge cargo from the cargo support assembly or raise or lower the cargo to a position appropriate for receiving or discharging the cargo.

As seen in FIG. 4, the cargo handling device 10 includes a actuator 150 for moving the top end 134 of the vertical lift 120 along its path of travel 142. The actuator 150 may be any one of a number of different mechanisms, but is illustrated as a hydraulic cylinder 151 of conventional design. The hydraulic cylinder is connected in fluid flowing relation relative to a source of hydraulic fluid, under pressure (not shown). The hydraulic cylinder 151 includes a moveable ram 153. The ram 153 has a distal end 154 which is connected by means of a pin 155 in pivotal force engaging relation relative to the cross-pieces 132 (FIG. 7).

Figure 5:
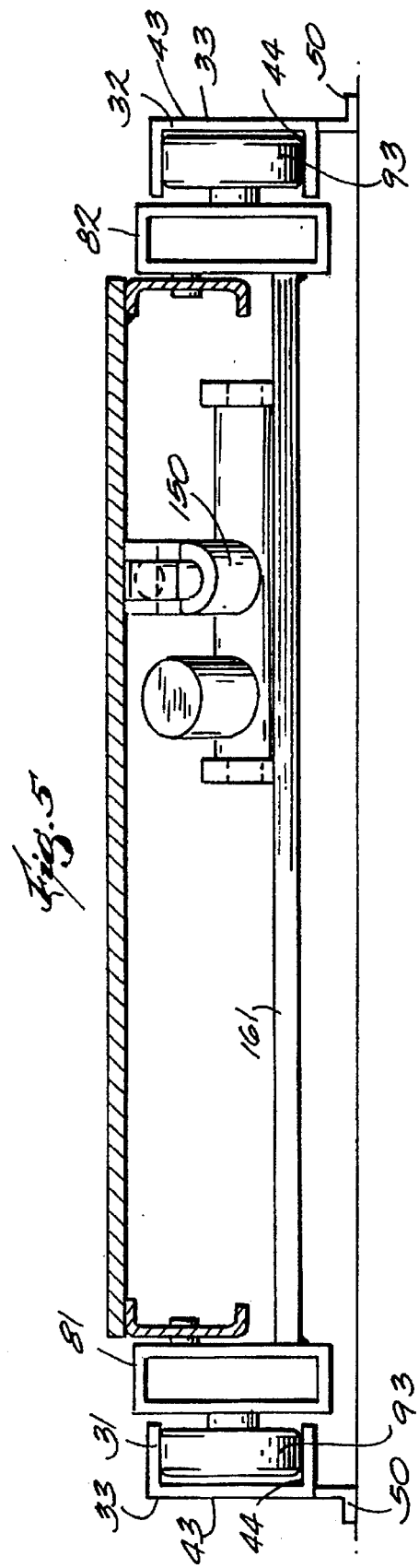
FIG. 5 is a cross-sectional view of the support and extension members of the cargo handling device taken along the line 5—5 of FIG. 3.

The cylinder 151 is connected to a base member 160 which is borne by a support beam 161 (FIG. 5). The support beam 161 is fastened by welding, or the like, on the extension members 81 and 82 and, therefore, moveable therewith. Extension or retraction of the ram 153 causes the top end 134 of the vertical lift 120 to move along the path of travel 142.

As best seen by reference to FIGS. 6A and 7, a cargo support assembly or cage 165 is connected to the vertical lift 120. The cage includes a two vertical members 167 connected to each other by one or more cross-pieces 168. The cage 165 also includes a first side member 169 and a second side member 170. Each side member may have one or more apertures 171. In addition, the cage has a plurality of holding members 172, a floor 173, and may optionally include sidewalls and other features (not shown) that are designed to help secure cargo therein. Of course, the exact configuration will depend of the type of cargo being transported.

Each of the vertical members 167 has a plurality of bearing assemblies 180 which are shown as wheels. The bearing assemblies 180 engage the tracks 121 of the vertical lift 120, enabling the cage 165 to be movable between a first, low position 185 and a second, high position 187 (FIG. 4). It should be understood that the cage may be lifted several feet or more, although this is not shown with exact detail in the drawings.

Figure 6:
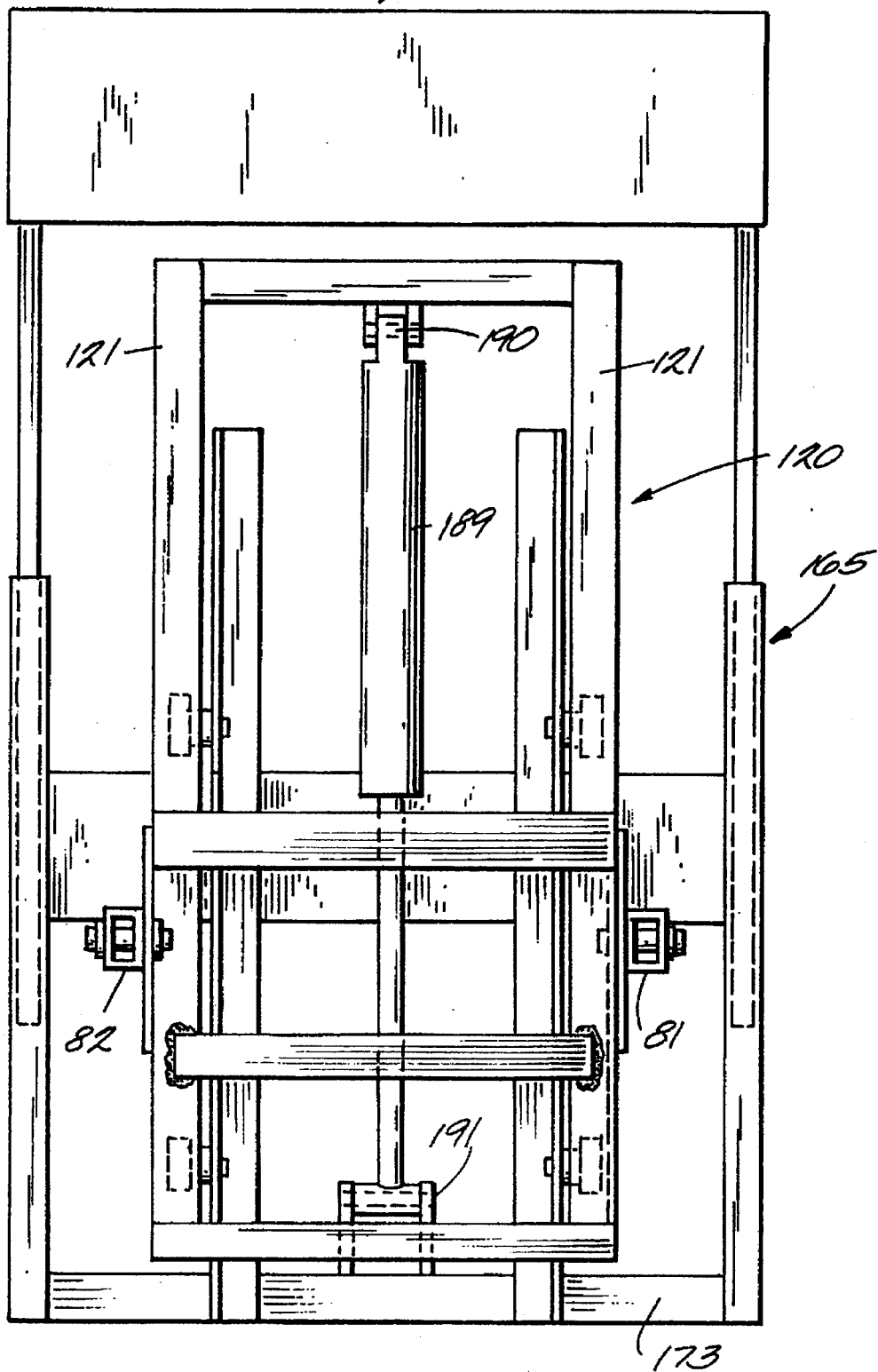
FIG. 6 is a cross-sectional view of one embodiment of the present invention showing the vertical lift and cargo support assembly.

As shown in FIG. 6, an actuator 189 moves the cage 165 between the high and low positions. The actuator has a first portion 190 mounted to the vertical lift 120 and a second portion 191 that is connected to one of the cross-pieces 169 of the cage 165. The actuator 189, which in one embodiment is a hydraulic cylinder, extends and retracts causing the cage and to rise and lower, respectively. In another embodiment of the present invention, the actuator includes a powered cylinder, preferably a hydraulic cylinder 193, and chain and pulley system (described below).

As best seen by reference to FIG. 6A–9, the hydraulic cylinder 193 is mounted on the cross-pieces 132 of the vertical lift 120. The hydraulic cylinder 193 includes a ram 194 having a top end 195 with a dual pulley 196 mounted thereon. The dual pulley 196 include two sprockets 197 and 198. The dual pulley can swivel in path indicated by a line 199. The sprockets 197 and 198 are engaged by chains 200 and 202, respectively. The chain 200 has first and second ends 204 and 205. Similarly, the chain 202 has first and second ends 206 and 207. The first ends 204 and 206 are coupled to the floor 173. The second ends are attached to a swivel assembly 210 mounted one of the cross-pieces 132 (FIG. 7A). The swivel assembly 210 includes first and second plates 214 and 216. A center pivot 219 is received through each plate and mounted on the one cross-piece 132. The swivel assembly can move along a path indicated by the line 212. The swivel motion of the swivel assembly 210 ensures smooth and even pulling action by the chains 200 and 202.

When the ram 194 is extended, the force it exerts causes the sprockets 197 and 198 to turn in a clockwise direction pulling the chains 200 and 202 in such a fashion as to lift the floor 173 of the cage 165. When the ram 194 is retracted, the sprockets turn counter clockwise lowering the first ends 204 and 206 of the chains 200 and 202, thereby lowering the floor 173 of the cage 165. Thusly, the cage 165 is moved between the first, low position 185 and the second, high position 187.

A number of mechanisms can be used to raise and lower the cage 175 such as an electric ball screw or a gear rack and the use of such devices would be apparent to those skilled in the art. However, they are not discussed herein for the sake of brevity. In addition, it should be understood that the actuator and hydraulic cylinder and pulley system described above can be modified and take a variety of forms. For example, the stroke of the actuator 189 may be modified for various applications in order to adjust the distance the cage 165 may be raised and lowered. The pulley system may also be modified to adjust the distance the cage may be raised and lowered. This may be accomplished by adjusting the length of the chains 200 and 202 and the stroke of the hydraulic cylinder 193.

In addition to the features described above, the cage 175 includes a head plate support 225. The head plate support 225 includes a top brace 226 in the form of a rectangular frame or body and two shafts 228 and 230. The shafts 228 and 230 are telescopingly mounted in the side members 169 and 170, respectively. The shafts 228 and 230 have a plurality of apertures 233. The height of the head plate support 225 from the floor 173 may be adjusted by aligning the apertures 171 and 233 at various heights and securing the desired position by means of pins 235. In addition, the head plate support 225 may removed entirely if required for a specific application.

OPERATION

The cargo handling device 10 permits the transportation of relatively tall cargo such as portable medical devices in vehicles having cargo areas of limited height. The handling of tall loads is accomplished by providing an extendible frame assembly and extending that frame assembly so that the vertical lift and cage are moved to a distal position relative to the cargo area. At that point the vertical lift along with the cage is rotated between a horizontal position and a vertical position. Thus, the present invention pivots the cargo so that the relatively large length dimension of an overland vehicle's cargo area may be matched with the relatively tall height dimension of cargo such as a portable medical device, thereby permitting the tall cargo to be placed within the cargo area. The vertical lift also permits the cargo to be raised and lowered so that it may be loaded and unloaded at relatively high loading docks.

Although the present invention has been herein shown and described in what is conceived to be the most practical and preferred embodiment, it is recognized that departures may be made therefrom within the scope of the invention which is not to be limited to the illustrative details disclosed. In particular it should be understood that the telescoping, sliding action of components such as the extension members 81 and 82 within the support members 31 and 32 and the two vertical members 167 within the tracks 121 can be accomplished using a variety of bearing assemblies and that the support members 31 and 31 and the tracks 121 can have a variety of configurations. Examples of such configurations include the side-guide bearing and V-cam follower bearing track combinations shown in FIGS. 9A and 9B.

What is claimed is:

1. A cargo handling device for an overland vehicle, the cargo handling device comprising:

a base frame having a pair of support members for being mounted on the overland vehicle;

a pair of extension members individually slidably borne by the respective support members and moveable along a predetermined path of travel between a first, stowed position, and a second, deployed position, wherein the individual extension members each have a proximal end and an opposite distal end;

a vertical lift connected to each of the individual extension members at a single pivot point on each respective extension member, the vertical lift rotatably moveable on a single axis which is substantially perpendicular to distal end portions of each of the individual extension members and from a first position, where the vertical lift is disposed in a substantially horizontal position, to a second position, where the vertical lift is disposed in a substantially vertical position, the vertical lift including one or more longitudinally positioned tracks and an actuator having a first portion which is coupled to the vertical lift and a second portion; and a cargo support assembly slidably engaged with the one or more tracks and coupled to the second portion of the actuator, wherein the actuator is operable to move the cargo support assembly in a substantially vertical direction between, a first, low position and a second, high position.

2. A cargo handling device as claimed in claim 1, further comprising one or more wheels for engaging the surface upon which the overland vehicle rests and mounted on the vertical lift.

3. A cargo handling device as claimed in claim 1, wherein the actuator is a powered cylinder and pulley system.

4. A cargo handling device as claimed in claim 3, wherein the cargo support assembly includes a floor, the vertical lift includes first and second cross-pieces, and the powered cylinder is mounted on the first cross-piece of the vertical lift and includes a ram having a top end with a dual pulley mounted thereon, the dual pulley including two sprockets, each sprocket engaged by a chain and each chain coupled between the floor and the second cross-piece.

5. A cargo handling device as claimed in claim 1, further comprising a means for assisting the movement of the vertical lift from the first position to the second position.

6. A cargo handling device as claimed in claim 5, wherein the means for assisting movement of the cargo support assembly is a hydraulic cylinder.

7. A cargo handling device for use with an overland vehicle, the cargo handling device comprising:

a base frame having a pair of support members for being mounted on the overland vehicle;

a pair of extension members individually slidably borne by the respective support members and moveable along a predetermined path of travel from a first, stowed position, to a second deployed position, and wherein the individual extension members each have a proximal end, and an opposite distal end;

a vertical lift having a top end, the vertical lift mounted on the distal end portion of each of the individual extension members at a single pivot point on each respective extension member, the top end of the vertical lift rotatably moveable about a single axis which is substantially perpendicular to distal end portions of each of the extension members and between a first position, where the vertical lift is disposed in a substantially horizontal position, to a second position, where the vertical lift is disposed in a substantially vertical position, the vertical lift including one or more longitudinally positioned tracks and an actuator having a first portion which is coupled to the vertical lift and a second portion; and a cargo support assembly slidably engaged with the one or more tracks and coupled to the second portion of the actuator, wherein the actuator is operable to move the cargo support assembly in a substantially vertical direction between, a first, low position and a second, high position, the cargo support assembly including a head plate support removably mounted thereto.

8. A cargo handling device as claimed in claim 7, wherein the cargo support assembly includes one or more side members and the head plate support includes one or more shafts individually and telescopingly mounted in the one or more side members.

9. A cargo handling device as claimed in claim 7, further comprising one or more wheels for engaging the surface upon which the overland vehicle rests and mounted on the vertical lift.

10. A cargo handling device as claimed in claim 7, wherein the actuator is a powered cylinder and pulley system.

11. A cargo handling system as claimed in claim 10, wherein the cargo support assembly includes a floor, the vertical lift includes first and second cross-pieces, and the powered cylinder is mounted on the first cross-piece of the vertical lift and includes a ram having a top end with a dual pulley mounted thereon, the dual pulley including two sprockets, each sprocket engaged by a chain and each chain coupled between the floor and the second cross-piece.

12. A cargo handling device as claimed in claim 7, further comprising a means for assisting the movement of the vertical lift from the first position to the second position.

13. A cargo handling device as claimed in claim 12, wherein the means for assisting movement of the cargo support assembly is a hydraulic cylinder.

* * * * *